United States Patent [19]
Goins, III et al.

[11] Patent Number: 5,927,591
[45] Date of Patent: Jul. 27, 1999

[54] SALVAGE METHOD AND APPARATUS FOR RECOVERING MICROELECTRONIC COMPONENTS FROM PRINTED CIRCUIT BOARDS

[75] Inventors: Fred A. Goins, III, Boise; David Clark, Mountain Home; Thomas Hansford, Emmett, all of Id.

[73] Assignee: MCMS, Inc., Nampa, Id.

[21] Appl. No.: 08/775,644

[22] Filed: Dec. 31, 1996

[51] Int. Cl.⁶ .................................................. B23K 1/018
[52] U.S. Cl. ............................................. 228/264; 228/19
[58] Field of Search .................... 228/264, 19; 29/426.1, 29/762

[56] References Cited

U.S. PATENT DOCUMENTS

| | | | |
|---|---|---|---|
| 5,148,969 | 9/1992 | Boucher et al. | 228/264 |
| 5,214,849 | 6/1993 | Jones, Jr. | 29/762 |
| 5,722,579 | 3/1998 | Yu et al. | 228/264 |

*Primary Examiner*—Patrick Ryan
*Assistant Examiner*—Jeffrey T. Knapp
*Attorney, Agent, or Firm*—Seed and Berry, LLP

[57] ABSTRACT

A salvage device facilitates detaching a plurality of components soldered to a plurality of modules used in printed circuit board assemblies. In one embodiment, a salvage device has a component receptacle with a component receiver that is adapted to hold a plurality of detached components. The salvage device also has a module holder attached to the component receptacle. In operation, the module holder suspends a plurality of modules over the component receiver to space the components attached to the modules apart from the component receiver. The salvage device is then placed in an oven to melt the solder contacts that bond the components to the modules. After the solder contacts reach a molten state, the components are preferably separated from the module by vibrating the components and the modules to break the surface tension of the molten solder. The components then fall into the component receiver and are removed from the oven.

59 Claims, 4 Drawing Sheets

SALVAGE METHOD AND APPARATUS FOR RECOVERING MICROELECTRONIC COMPONENTS FROM PRINTED CIRCUIT BOARDS

TECHNICAL FIELD

The present invention relates to recovering operable microelectronic components from printed circuit board assemblies that are defective or do not meet customer requirements.

BACKGROUND OF THE INVENTION

Printed circuit board assemblies (PCBs) with electrical components are used in computers, communications equipment, televisions, and many other products. A PCB is generally a laminated board with circuit traces on one or both external surfaces and sometimes inside the board. A wide variety of electrical components are mounted on one or both external surfaces of the circuit board, such as processors, memory devices, clocks, resistors, capacitors and virtually any other type of electrical component. The electrical components may be individually attached to selected locations on the external surfaces of the PCB with a solder paste, or several similar electrical components may be mounted to an interface unit that is attached to the printed circuit board. The electrical components may be attached to the interface units or PCBs with a solder paste using through-hole mounting or surface mounting techniques. Since the electronics manufacturing industry is highly competitive, it is important to maximize the throughput of PCB assemblies while reducing the waste of operable components.

To surface mount electrical components to a PCB, pads of solder paste are printed onto the PCB, and then the components are pressed against the solder pads. The PCB and the components are subsequently placed in a solder reflow oven that melts the solder particles in the solder paste to bond and electrically couple the components to the PCB. In a typical PCB assembly process, many PCBs may be fully assembled into market-ready products in a short period of time.

One important aspect of manufacturing PCB assemblies is to recover operable components from unusable PCB assemblies. PCB assemblies may not be usable because the board is defective or components attached to the board are defective. Also, PCB assemblies may not be usable because a customer may request design changes after many PCB assemblies have been partially or fully assembled. In either case, it is desirable to salvage and reuse the operable electronic components from the unusable PCB assemblies.

To recover operable electronic components from unusable PCB assemblies, the operable electronic components are detached from the interface units or PCBs so that they may be reused on another PCB assembly. One conventional process for salvaging electronic components is to place a plurality of PCBs or interface units onto a plate and heat the components in a solder reflow oven of a PCB assembly line until the solder melts. Each PCB or interface unit is then individually lifted and tapped against the plate to dislodge the components. The plate may simply be an old PCB or a rigid sheet that is the correct size and shape to ride on the conveyor rails of the reflow oven.

Several problems exist with the conventional process for salvaging electronic components from unusable PCB assemblies. One problem is that the salvage process is time-consuming and it uses the reflow ovens of the PCB assembly line. Accordingly, salvaging operable components from unusable PCB assemblies interrupts the normal processing of marketable PCB assemblies. Conventional salvage processes, therefore, may reduce the throughput of normal PCB assembly operations.

Another problem with conventional component salvage processes is that the yield of operable salvage components may be relatively low. As the PCBs or interface units are tapped against the plate, several components may land on the plate in contact with another component while the solder is in a molten state. As a result, several components may stick to one another after the solder cools to a solid state. Additionally, some components may even bounce off of the plate and fall into the reflow oven. Therefore, in conventional salvage processes, many components may have to be reheated or are simply lost in the reflow oven.

In light of the problems associated with conventional salvage processes, it would be desirable to increase the throughput and yield for salvaging electrical components from unusable PCB assemblies.

SUMMARY OF THE INVENTION

The present invention is a salvage device and process for detaching electrical components from modules, which may include interface units, printed circuit boards or other types of devices to which components are attached. In one embodiment, a salvage device has a component receptacle with a component receiver that can hold a plurality of detached components. The salvage device also has a module holder positioned above the component receptacle. The module holder is preferably attached to the component receptacle, and the module holder preferably holds a plurality of modules to space the components apart from the component receiver. In a preferred embodiment, the salvage device also has an actuator that strikes the component receptacle or module holder to vibrate the salvage device.

In operation, the module holder suspends a plurality of modules over the component receiver to space the components apart from the component receiver. The salvage device is then placed in an oven to melt the solder contacts that bond the components to the modules. After the solder contacts reach a molten state, the components are preferably separated from the modules by vibrating the salvage device to break the surface tension of the molten solder bonding the components to the modules. The components accordingly fall from the modules onto the component receiver.

In another embodiment, the component receptacle preferably has a frame with a first member attached to one side of the component receiver and a second member attached to the other side of the component receiver. The component receiver is preferably a tray or pan with a plurality of compartments that are configured to receive individual components as they land on the component receiver, and the module holder is preferably a module rack that has a plurality of rod pairs with first and second rods spaced apart from one another along the component receptacle. The first and second rods of each rod pair preferably support opposing edges of a plurality of modules to suspend the modules over the component receiver so that the components do not contact one another after landing on the component receiver.

DETAILED DESCRIPTION OF THE INVENTION

The present invention is a salvage device for detaching components from modules used in manufacturing printed circuit board assemblies. An important aspect of an embodiment of the invention is that a plurality of components are detached from a plurality of modules without individually handling each module. Another important aspect of an embodiment of the invention is to suspend the modules over a component receiver so that the components are spaced apart from the component receiver by a relatively small distance. The components accordingly land onto the component receiver in substantially the same pattern that they were connected to the modules to prevent the components from contacting one another while the solder is in a molten state. FIGS. 1–8, in which like reference numbers refer to like parts, illustrate several embodiments of salvage devices in accordance with the invention.

Figure 1:
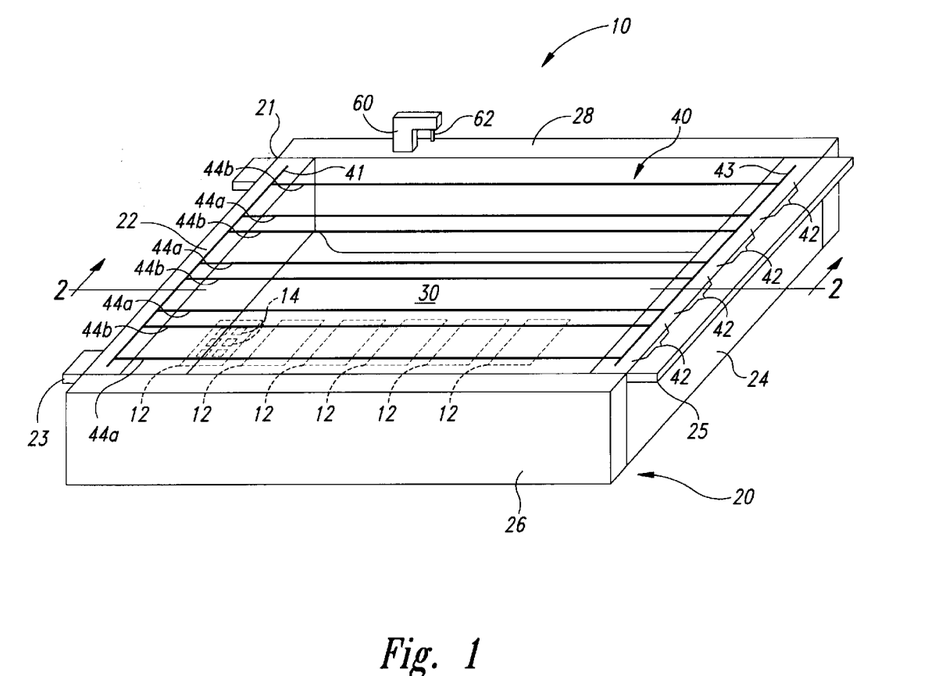
FIG. 1 is an isometric view of an embodiment of a salvage device in accordance with the invention.
Figure 2:
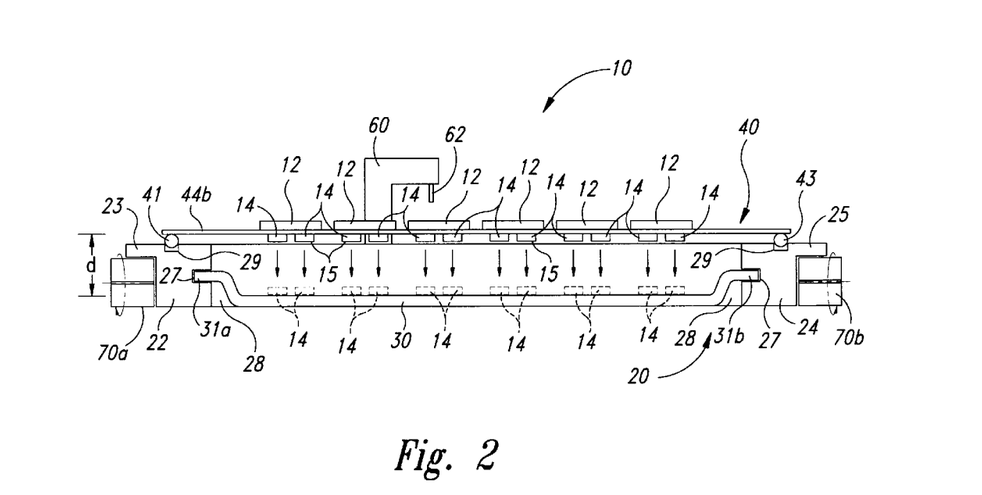
FIG. 2 is a cross-sectional view of the embodiment of the salvage device of FIG. 1 taken along line 2—2.

FIG. 1 is an isometric view and FIG. 2 is a cross-sectional view of an embodiment of a salvage device 10 in accordance with the invention. The salvage device 10 preferably has a component receptacle 20, a module holder 40 attached to the component receptacle 20, and an actuator 60 attached to either the component receptacle 20 (as shown) or the module holder 40 (not shown). The salvage device 10 preferably holds a plurality of modules 12, and each module 12 has a plurality of components 14. For example, the components 14 may be DRAM devices and the modules 12 may be interface units such as single inline memory modules ("SIMMs") or double in line memory modules (DIMMs"). The SIMMs and DIMMs couple the DRAM devices 14 to a printed circuit board (not shown). Although the invention will primarily be described with the modules 12 being interface units and components 14 being DRAM devices, it will be appreciated that the terms "modules" and "components" have broader meanings. For example, a module may be a printed circuit board, an interface unit, or any other device to which components are attached. By way of further example, a component may be virtually any type of electronic device, including, but not limited to, processors, clocks, memory devices, capacitors, resistors, LEDs, and displays.

The component receptacle 20 has a frame 21 with at least a first member 22 and a second member 24 spaced apart from one another. The frame 21 of the component receptacle 20 also preferably has a first end member 26 attached to one end of the first and second members 22 and 24, and a second end member 28 attached to the other end of the first and second members 22 and 24. The component receptacle 20 also has a component receiver 30 that is preferably attached to the inner walls of the first and second members 22 and 24 (best shown in FIG. 2). The component receiver 30 may be a plate, tray or pan to hold the components 14 after they are detached from the modules 12. The component receiver 30 preferably has first and second edges 31(a) and 31(b) received in grooves 27 that extend along the inner walls of the first and second members 22 and 24, respectively. It will be appreciated, however, that the component receiver 30 may be attached to the first and second members 22 and 24 by other means such as with fasteners (e.g., screws and bolts) or welds, or the component receiver 30 may be made integrally with the first and second members 22 and 24.

In a preferred embodiment, the first and second members 22 and 24 of the component receptacle 20 ride along conveyor tracks 70(a) and 70(b) of a solder reflow oven (shown in FIG. 2). The first member 22 preferably has a flange 23 that rides along a first conveyor track 70(a), and the second member 24 preferably has a flange 25 that rides along a second conveyor track 70(b). As shown by the flange 25 in FIG. 1, the flanges may run along the full length of the first and second members 22 and 24, respectively. Alternatively, as shown by the other flange 23 in FIG. 1, the flanges may be short lips or fingers that are spaced along the first and second members 22 and 24, respectively. In another embodiment (not shown), the component receiver 30 may be wider so that the bottom surfaces of the first and second members 22 and 24 ride on the conveyor tracks 70(a) and 70(b).

In the embodiment of the salvage device 10 shown in FIGS. 1 and 2, the module holder 40 is a module rack or grate that holds a plurality of modules 12 so that the top, flat surfaces 15 of the components 14 are juxtaposed to the component receiver 30. The module holder 40 preferably has a plurality of rod pairs 42, and each rod pair 42 has first and second rods 44(a) and 44(b) that extend from the first member 22 to the second member 24. The first and second rods 44(a) and 44(b), more specifically, may be attached to runners 41 and 43 to form a fixed-configuration module holder 40 in which the first and second rods 44(a) and 44(b) do not move with respect to one another. As discussed below with respect to other embodiments of salvage devices in accordance with the invention, the rods 44(a) and 44(b) of the module holder 40 may also be moved with respect to one another.

The module holder 40 is preferably pivotally attached to the component receptacle 20 or adapted to be removed from the component receptacle 20 so that the detached components 14 (shown in broken lines) may be removed from the component receiver 30. In one embodiment, the runners 41 and 43 of the module holder 40 may be positioned in grooves 29 (FIG. 2) that extend along the top surfaces of the first and second members 22 and 24 to inhibit the module holder 40 from moving with respect to the component receptacle 20. In another embodiment (not shown), the fixed-configuration module holder 40 may be simply positioned on the top surfaces of the first and second member 22 and 24.

The module holder 40 and the component receiver 30 are preferably spaced apart from one another by a distance "d" that is sufficient to allow the components 14 to fall from the modules 12 and land onto the upper surface of the module receiver 30. It is generally desirable to adjust the distance d between the module holder 40 and the component receiver 30 to minimize the space between the components 14 and component receiver 30 so that the components 14 land on the component receiver 30 with a minimal amount of force and lateral displacement. In a preferred embodiment, the distance d between the module holder 40 and the component receiver 30 is approximately 0.05–1.0 inches so that the top surfaces 15 of the components 14 land flat onto the component receiver 30 without bouncing. The components 14, therefore, preferably land onto the top surface of the component receiver 30 in the same pattern in which they were attached to the modules 12 to prevent the components 14 from touching each other while the solder is in a molten state.

The mechanical actuator 60 strikes the component receptacle 20 or the module holder 40 to vibrate the modules 12 and the components 14 while the solder is in a molten state. The mechanical actuator 60 may have a ram 62 or other type of device that sharply strikes the component receptacle 20 or the module holder 40. In one embodiment, the actuator 60 is a pneumatic actuator that drives the ram 62 against the frame 21 of the component receptacle 20. In another embodiment, the actuator 60 is a weight or hammer that strikes the component receptacle 20. In operation, gravity and the shock wave generated by the actuator break the bond of the molten solder to detach the components 14 from the modules 12.

To detach the components 14 from the modules 12, a plurality of modules 12 are placed on the first and second rods 44(a) and 44(b) of the rod pairs 42 so that the components 14 are juxtaposed to the component receiver 30. The salvage device 10 is then placed on the conveyor tracks 70(a) and 70(b) and moved into a solder reflow oven (not shown) where it is heated to melt the solder bonding the components 14 to the modules 12. After the solder melts, the actuator 60 drives the ram 62 against the end member 28 of the frame 21 to vibrate the components 14 and the modules 12. The actuator 60 may repeatedly drive the ram 62 against the frame 21 of the component receptacle 20 until all of the components 14 are detached from the modules 12. The modules 14 preferably fall only a short distance and land on their top, flat surface 15 without significantly bouncing or moving transversely across the component receiver 30. Accordingly, the components 14 preferably land on the component receiver 30 in an orderly pattern in which a substantial number of components 14 do not touch one another. The salvage device 10 is then removed from the reflow oven, and the detached components 14 are removed from the salvage device 10.

One advantage of an embodiment of the salvage device 10 is that it reduces the time to separate components from modules. Unlike conventional salvage techniques that handle each module individually, the preferred embodiment of the salvage device 10 detaches the components 14 from a plurality of modules 12 at substantially the same time without individually handling each module 12. Thus, compared to conventional salvaging processes, the preferred embodiment of the salvage device 10 reduces the time to separate the components 14 from the modules 12.

Another advantage of an embodiment of the salvage device 10 is that it reduces the time and labor to separate the components 14 from one another after they have been detached from the modules 12. The component receiver 30 and the module holder 40 are preferably spaced apart from one another so that the components 14 land on the component receiver 30 in an orderly pattern in which most of the components 14 do not touch one another. By inhibiting the components 14 from touching one another when the solder is in a molten state, the components 14 do not reattach to one another as the solder cools. The preferred embodiment of the salvage device 10 accordingly reduces the time and labor to subsequently separate the components 14 from one another after they are detached from the modules 12.

Still another advantage of an embodiment of the salvage device 10 is that it increases the yield of operable salvaged components. Conventional salvage techniques that allow the components 14 to land randomly may have a relatively low yield of operable salvage devices because some of the components may bounce off of the plate and fall onto the floor or in the reflow oven. Conventional salvage devices may also have a low yield because many of the detached components 14 may contact one another after landing on the plate while the solder is in a molten state, and thus many of the components 14 may be stuck together when the solder cools. As a result, many of the components 14 are reheated, which may eventually damage some of the components 14. In contrast, the module holder 40 and component receiver 30 are preferably configured to suspend the components 14 so that the components 14 land on the component receiver 30 without bouncing or contacting one another. Therefore, compared to conventional salvage techniques, the preferred embodiment of the salvage device 10 increases the yield of operable salvaged components.

Figure 3:
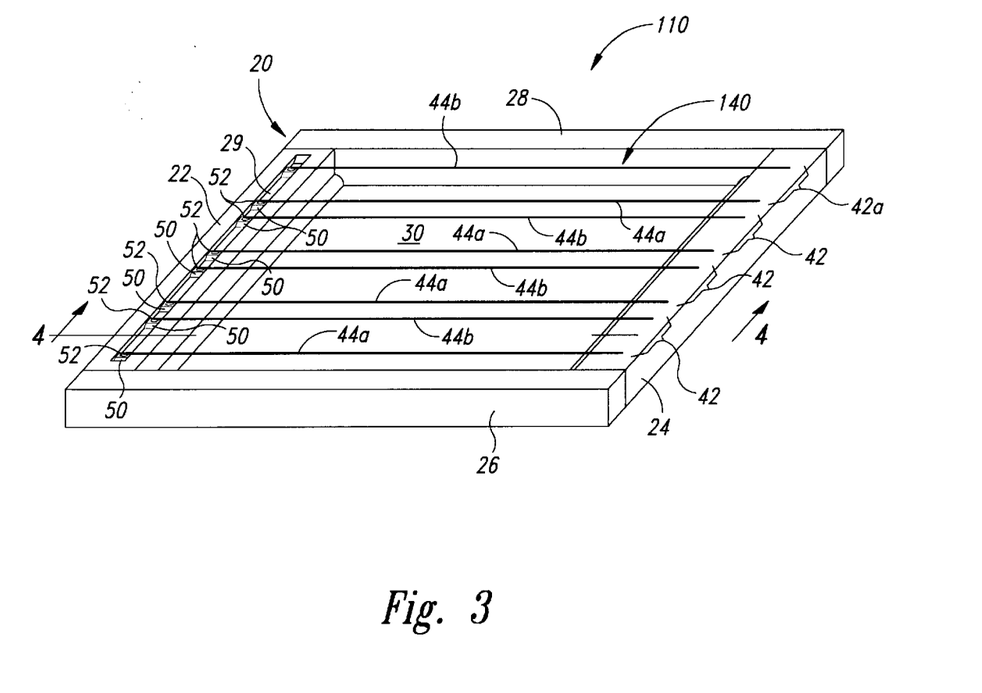
FIG. 3 is an isometric view of another embodiment of a salvage device in accordance with the invention.
Figure 4:
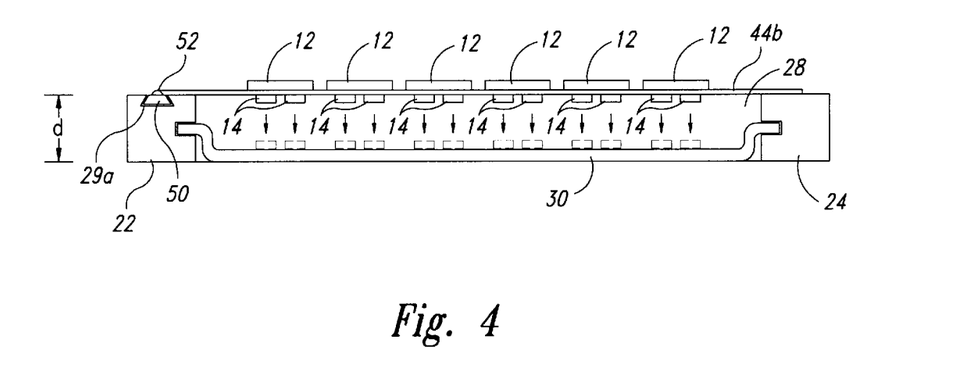
FIG. 4 is a cross-sectional view of the embodiment of the salvage device of FIG. 3 taken along line 4—4.

FIG. 3 is an isometric view and FIG. 4 is a cross-sectional view of another embodiment of a salvage device 110 that has an adjustable module holder 140 with movable rods 44(a) and 44(b). As discussed above with respect to the salvage device 10, the salvage device 110 has a component receptacle 20 with first and second members 22 and 24, and the adjustable module holder 140 is attached to the component receptacle 20 to suspend a plurality of modules 12 and components 14 (shown in FIG. 4) over the component receiver 30. Each of the first and second rods 44(a) and 44(b) of each rod pair 42 is pivotally attached to a block 50 by a ball joint 52, pin or other pivoting attachment device. The blocks 50 preferably have a trapezoidal cross-sectional shape that fits within a channel 29(a) to allow the blocks 50 to slide along the channel 29(a). The other ends of the rods 44(a) and 44(b) preferably rest unattached on the upper surface of the second member 24. As shown by the rod pairs 42 in FIG. 3, each first and second rod 44(a) and 44(b) is preferably attached to a block 50 so that both of the first and second rods 44(a) and 44(b) of each rod pair 42 may be moved along the component receptacle 20. Alternatively, as shown by the rod pair 42(a) in FIG. 3, the second rod 44(b) is fixed to the component receptacle 20 and the first rod 44(a) is attached to a block 50 so that only the first rod 44(a) of the rod pair 42(a) may be moved along the component receptacle 20. Accordingly, at least one of the first and second rods 44(a) and 44(b) of the adjustable module holder 140 is moveable to adjust the distance between the rods.

The salvage device 110 illustrated in FIGS. 3 and 4 operates in substantially the same manner as the salvage device 10 discussed above in FIGS. 1 and 2. As mentioned above, an advantage of the salvage device 110 is that the distance between the first and second rods 44(a) and 44(b) of each rod pair 42 may be changed to position the rods so that they support different modules with different configurations. Accordingly, the adjustable module holder 140 of the salvage device 110 provides a universal salvage fixture for holding a plurality of different modules.

Figure 5:
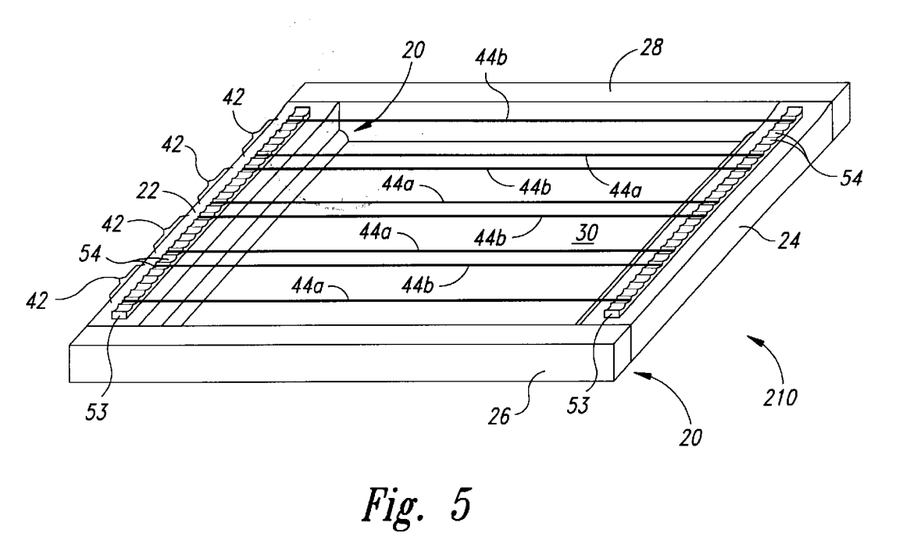
FIG. 5 is an isometric view of another embodiment of a salvage device in accordance with the invention.

FIG. 5 is an isometric view of another embodiment of a salvage device 210 with another adjustable module holder 240. As discussed above with respect to the salvage device 10, the salvage device 210 has a component receptacle 20 with first and second members 22 and 24, and the adjustable module holder 240 has a plurality of rod pairs 42 with first and second rods 44(a) and 44(b). Each of the rods 44(a) and 44(b) may be moved along the first and second members 22 and 24 to adjust the distance between the individual rods 44(a) and 44(b). In this embodiment, the adjustable module holder 240 has an elongated rack 53 extending longitudinally along the top surface of each of the first and second members 22 and 24. Each rack 53 has a plurality of depressions 54 that hold the rods 44(a) and 44(b) transversely with respect to the longitudinal axis of the racks 53. To adjust the distance between the rods 44(a) and 44(b), the rods are simply positioned in the depressions 54 that space the rods 44(a) and 44(b) apart from one another by a desired distance.

Figure 6:
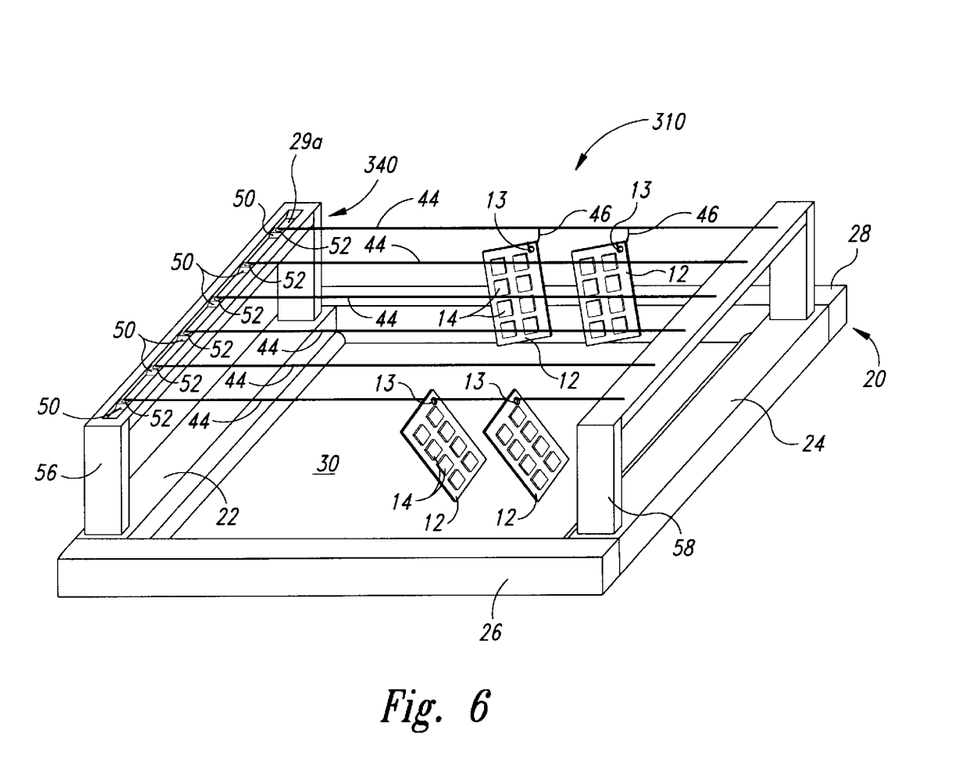
FIG. 6 is an isometric view of still another embodiment of a salvage device in accordance with the invention.

FIG. 6 is an isometric view of still another embodiment of a salvage device 310 for hanging a plurality of modules 12 substantially vertically over the component receiver 30. The salvage device 310 has a component receptacle 20 and a module holder 340 attached to the component receptacle 20. The module holder 340 preferably has a first support structure 56 attached to the first member 22 of the component receptacle 20, a second support structure 58 attached to the second member 24 of the component receptacle 20, and a plurality of rods 44 extending from the first support structure 56 to the second support structure 58. The support structures 56 and 58 space the rods 44 apart from component receiver 30 to hold the modules 12 in a substantially vertical orientation. As described above, the rods 44 are preferably attached to blocks 50 that slide along a channel 29(a) in the upper surface of either the first or second support structures 56 or 58 to adjust the distance between the rods 44. A plurality of hooks 46 may also be attached to each of the rods 44.

To recover the components 14 using the salvage device 310, the modules 12 are preferably hung on the rods 44 by lifting the rods 44 and passing an alignment hole 13 in each of the modules 12 over the rods 44. Alternatively, the alignment holes 13 in the modules 12 may be passed over the hooks 46 attached to the rods 44. As discussed above with respect to the salvage device 10, the modules 12 hung from the module holder 340 are heated in a reflow oven to melt the solder bonding the components 14 to the modules 12. An actuator (not shown) may then strike the salvage device 310 to detach the components 14 from the modules 12.

An advantage of the embodiment of the salvage device 310 illustrated in FIG. 6 is that components 14 may be simultaneously removed from both sides of the modules 12. However, compared to the other embodiments of the salvage devices illustrated in FIGS. 1–5, the substantially vertical orientation of the modules 12 causes the components 14 to land randomly on the component receiver 30 in a manner in which they may contact one another. Accordingly, when the solder cools and hardens, some of the components recovered using the salvage device 310 may adhere to one another.

Figure 7:
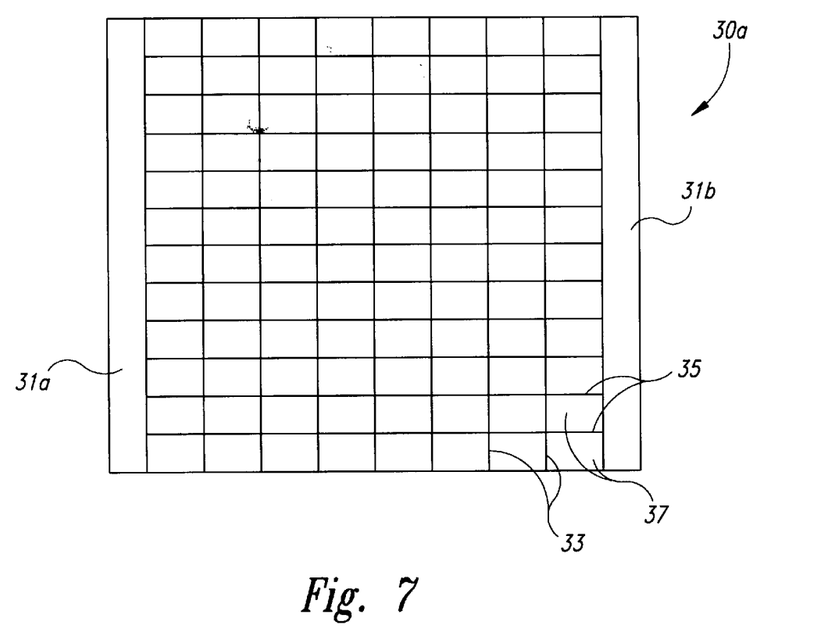
FIG. 7 is a top plan view of an embodiment of a component receiver in accordance with the invention.

FIG. 7 is a top plan view of another embodiment of a component receiver 30(a) that my be used with any of the salvage devices of the invention. The component receiver 30(a) is a tray, pan, plate or other similar device with a first edge 31(a), a second edge 31(b), and a plurality of separators 33 and 35. The separators 33 and 35 are preferably ridges or short walls arranged in a pattern to form a plurality of compartments 37 that separate the detached components 14 from one another as they land on the component receiver 30(a). The compartments 37 may be configured to correspond to the configuration of the components when the modules are suspended over the component receiver 30(a). In one embodiment, the separators 33 and 35 extend substantially normal to each other to form rectilinear compartments 37. It will be appreciated, however, that the separators 33 and 35 may have different configurations to form other compartments 37 that also inhibit the components from contacting one another after they are detached from the modules.

Figure 8:
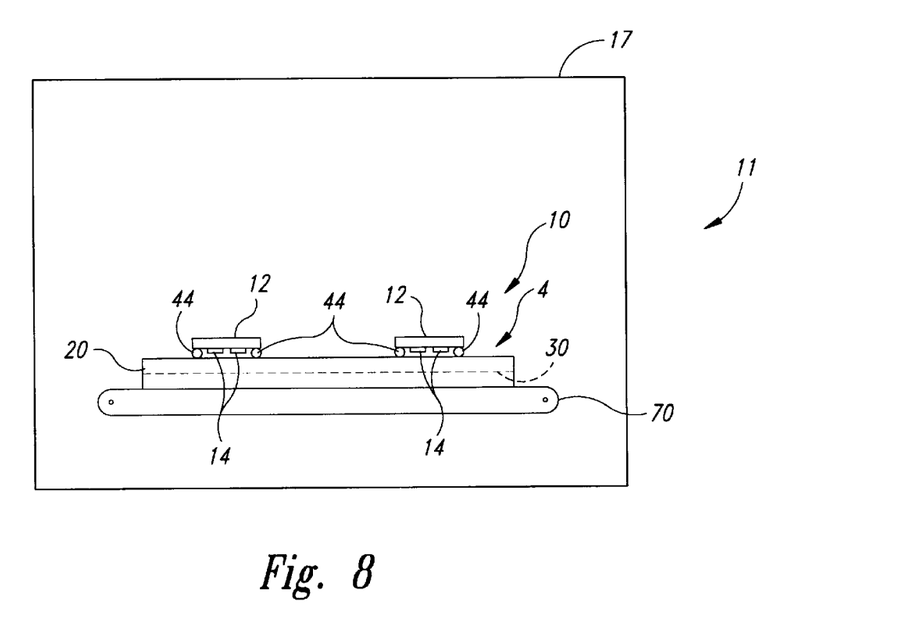
FIG. 8 is a schematic view of an embodiment of a salvage system in accordance with the invention.

FIG. 8 is a schematic view of an embodiment of a salvage system 11 in accordance with the invention in which the salvage device 10 is placed in a an oven 17. In operation, the salvage system 11 detaches the components 14 from the modules 12 in the same manner discussed above with respect to the salvage devices shown in FIGS. 1–7.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is Claimed is:

1. A salvage device for recovering operable components from modules used in the manufacturing of printed circuit board assemblies, comprising:

a component receptacle having a component receiver adapted to hold a plurality of detached components; and a module holder positioned above the component receptacle to hold a plurality of modules and position the components attached to the modules over the component receiver, wherein the component receptacle comprises a frame having a first member and a second member spaced apart from the first member, the module holder being attached to at least one of the first and second members to extend over at least a portion of the space between the first and second members, and the component receiver being attached to the first and second members.

2. A salvable jig for removing a plurality of components from a plurality of modules, comprising:

a plate;

a module suspender adapted to hold a plurality of modules over the plate, the salvage jig being adapted to be placed in an oven to melt solder contacts bonding the components to the modules; and a first member attached to one side of the plate and a second member attached to an opposing side of the plate, wherein the module suspender comprises at least one rod adapted to be passed through holes in the modules to hang the modules over the plate.

3. A salvage system for removing a plurality of components from a plurality of electrical modules, comprising:

a heating chamber;

a component receptacle having a component receiver, the component receptacle being adapted to be positioned in the heating chamber; and a module holder positioned above the component receptacle, the module holder having a module support positioned over the component receiver to suspend a plurality of modules over the component receiver, wherein the module holder comprises at least one rod adapted to be passed through holes in the modules to hang the modules over the component receiver.

4. A method of salvaging components from a plurality of modules, comprising:

suspending a plurality of modules having flat top surfaces over a component receptacle by positioning the modules on a module holder attached to a component receptacle with a component receiver to juxtapose the flat top surfaces of the components to the component receiver, wherein positioning the modules further comprises spacing the flat top surfaces of the components approximately between 0.05 and 1.0 inches from the component receiver; and detaching the components from the plurality of suspended modules, the components falling from the modules into the component receptacle.

5. A method of salvaging components attached to a plurality of modules, comprising:

positioning the plurality of modules on a module holder over a tray by spacing surfaces of the components apart from the tray by approximately 0.05 to 1.0 inches;

weakening bonds between the components and the plurality of modules; and agitating at least one of the module holder and the tray to dislodge the components from the modules.

6. A salvage device for recovering operable components from modules used in the manufacturing of printed circuit board assemblies, comprising:

a component receptacle having a component receiver adapted to hold a plurality of detached components; and a module holder positioned above the component receptacle to hold a plurality of modules and position the components attached to the modules over the component receiver, wherein the module holder comprises a module rack including a plurality of rod pairs, each rod pair having first and second rods spaced apart from one another along the component receptacle to support opposing edges of a plurality of modules, the first and second rods of each rod pair suspending the modules to juxtapose the components to the component receiver.

7. The salvage device of claim 6 wherein at least one of the first and second rods of each rod pair is moveable with respect to the other to position the first and second rods to hold different modules that have different dimensions.

8. A salvage device for recovering operable components from modules used in the manufacturing of printed circuit board assemblies, comprising:

a component receptacle having a component receiver adapted to hold a plurality of detached components; and a module holder positioned above the component receptacle to hold a plurality of modules and position the components attached to the modules over the component receiver, wherein the module holder comprises at least one rod adapted to be passed through holes in the modules to hang the modules over the component receiver.

9. The salvage device of claim 8 wherein one end of the rod is pivotally attached to the component receptacle, the rod being lifted into a raised position to load and unload modules on the rod and the rod being lowered into a support position to hold the modules over the component receiver.

10. The salvage device of claim 8 wherein the at least one rod comprises a plurality of rods spaced apart along the component receptacle.

11. A method of salvaging components attached to a plurality of modules, comprising:

positioning the plurality of modules on a module holder over a tray;

weakening bonds between the components and the plurality of modules; and agitating at least one of the module holder and the tray to dislodge the components from the modules such that the components dislodge onto the tray in a configuration similar to an attachment pattern on the module.

12. The method of claim 11 the agitating step comprises hitting at least one of the module holder and component receptacle with a ram to vibrate the components.

13. The method of claim 11 wherein the weakening step comprises heating the modules and components to melt solder contacts bonding the components to the modules.

14. The method of claim 13 wherein the heating step comprises placing the suspended modules and components in a solder reflow over.

15. A salvage jig for removing components from modules used in the manufacturing of printed circuit board assemblies, comprising:

a component catcher having a plate with first and second sides, a first member attached to the first side of the plate, and a second member attached to the second side of the plate; and a module rack attached to the component catcher and positioned over the plate to hold a plurality of components above the plate.

16. The salvage jig of claim 15 wherein the module holder comprises at least one rod adapted to be passed through holes in the modules to hang the modules over the plate.

17. The salvage jig of claim 15, further comprising an actuator attached to the component catcher, the actuator vibrating the component catcher to separate the components from the modules.

18. The salvage jig of claim 15 wherein the plate comprises a tray.

19. The salvage jig of claim 18 wherein the tray has a plurality of compartments to separate components from one another.

20. The salvage jig of claim 19 wherein the actuator is a ram adapted to engage at least one of the component catcher and the module holder, the ram shaking the module holder to detach components from the module.

21. A salvage system for removing a plurality of components from a plurality of electrical modules, comprising:

a heating chamber;

a component receptacle having a component receiver, the component receptacle being adapted to be positioned in the heating chamber; and a module holder positioned above the component receptacle in a plane at least approximately parallel to a plane of the component receiver, the module holder having a module support positioned over the component receiver to suspend a plurality of modules over the component receiver.

22. The salvage system of claim 21 wherein the heating chamber is a solder reflow oven.

23. The salvage system of claim 21, further comprising an actuator to selectively impart a force on the components that vibrates the components and the modules.

24. The salvage system of claim 21 wherein the module holder is attached to the component receptacle.

25. The salvage system of claim 21 wherein the module holder comprises a module rack having first and second rods spaced apart from one another along the component receptacle to support opposing edges of a plurality of modules, the first and second rods suspending the modules to juxtapose the components to the component receiver.

26. The salvage system of claim 25 wherein at least one of the first and second rods is moveable with respect to the other to position the first and second rods to hold different modules that have different dimensions.

27. A method of salvaging components from a plurality of modules, comprising:

suspending a plurality of modules over a component receptacle; and detaching the components from the plurality of suspended modules, the components falling from the modules into the component receptacle in a substantially similar pattern as originally attached to the module.

28. The method of claim 27 wherein the components have a flat top surfaces, and wherein the suspending step comprises positioning the modules on a module holder attached to a component receptacle with a component receiver to juxtapose the flat top surfaces of the components to the component receiver.

29. The method of claim 28 wherein the detaching step comprises heating the modules and components to melt solder contacts bonding the components to the modules.

30. The method of claim 29 wherein heating the modules comprises placing the suspended modules and components in a solder reflow oven.

31. The method of claim 29 wherein the detaching step further comprises vibrating the components and the modules.

32. The method of claim 31 wherein the vibrating step comprises hitting at least one of the module holder and component receptacle with a ram.

33. A salvage jig for removing a plurality of components from a plurality of modules, comprising:
   a plate; and
   a module suspender configured to hold a plurality of modules over the plate and positioned with respect to the plate so that detached components land on the plate in a pattern in which at least a substantial number of components do not touch one another, the salvage jig being adapted to be placed in an oven to melt solder contacts bonding the components to the modules.

34. The salvage jig of claim 33, further comprising an actuator to selectively impart a force on the salvage jig that vibrates the components.

35. The salvage jig of claim 33, further comprising a first member attached to one side of the plate and a second member attached to an opposing side of the plate.

36. The salvage jig of claim 35 wherein the plate has a plurality of compartments to separate components from one another.

37. The salvage jig of claim 35 wherein the actuator is a ram adapted to engage at least one of the plate, the first and second members, and the module suspender.

38. The salvage jig of claim 35 wherein the module suspender comprises a module rack having first and second rods spaced apart from one another along the first and second members to support a plurality of modules, the first and second rods suspending the modules to juxtapose the components to the plate.

39. The salvage jig of claim 38 wherein at least one of the first and second rods is moveable with respect to the other along the first and second members to position the first and second rods to hold different modules that have different dimensions.

40. A salvage device for recovering operable components from modules used in the manufacturing of printed circuit board assemblies, comprising:
   a component receptacle having a component receiver adapted to hold a plurality of detached components; and
   a module holder positioned above the component receptacle in a plane at least approximately parallel to a plane of the component receiver to hold a plurality of modules and position the components attached to the modules over the component receiver.

41. The salvage device of claim 40 wherein the module holder comprises a module rack attached to the component receptacle, the module rack having first and second rods spaced apart from one another along the component receptacle to support a plurality of modules, the first and second rods suspending the modules to juxtapose the components to the component receiver.

42. The salvage device of claim 40 wherein the module holder comprises a module rack having first and second rods spaced apart from one another along the component receptacle to support a plurality of modules, the first and second rods suspending the modules to juxtapose the components to the component receiver.

43. The salvage device of claim 42 wherein at least one of the first and second rods is moveable with respect to the other along the component receptacle to position the first and second rods to hold different modules that have different dimensions.

44. The salvage device of claim 40, further comprising an actuator to selectively impart a force on the components.

45. The salvage device of claim 44 wherein the actuator is a ram adapted to engage at least one of the component receptacle and the module holder, the ram vibrating the module holder to detach components from the modules.

46. The salvage jig of claim 45 wherein the module holder comprises a module rack having first and second rods spaced apart from one another along the component catcher to support a plurality of modules, the first and second rods suspending the modules to juxtapose the components to the plate.

47. The salvage device of claim 46 wherein at least one of the first and second rods is moveable with respect to the other along the component catcher to position the first and second rods to hold modules with different dimensions.

48. A salvage device for recovering operable components from modules used in the manufacturing of printed circuit board assemblies, comprising:
   a component receptacle having a component receiver adapted to hold a plurality of detached components, wherein the component receptacle comprises a first member attached to one side of the component receiver and a second member attached to another side of the component receiver; and
   a module holder positioned above the component receptacle to hold a plurality of modules and position the components attached to the modules over the component receiver, the module holder being attached to at least one of the first and second members of the component receptacle.

49. The salvage device of claim 48 wherein the component receiver comprises a tray.

50. The salvage device of claim 48 wherein the tray has a plurality of compartments.

51. The salvage device of claim 48 wherein the component receiver comprises a pan.

52. The salvage device of claim 48 wherein the component receiver comprises a screen.

53. The salvage device of claim 48 wherein the first member has a first flange to engage a first conveyor track of a reflow oven and the second member has a second flange to engage a second conveyor track of the reflow oven.

54. The salvage device of claim 53 wherein the first and second members comprise elongated first and second bars, respectively, the first flange being attached to an outside surface of the first bar and the second flange being attached to an outside surface of the second bar, and wherein the component receiver is attached to opposing inside surfaces of the first and second bars.

55. The salvage device of claim 48 wherein the module holder comprises at least one rod adapted to be passed through holes in the modules to suspend the modules substantially vertically over the component receiver, the at least one rod being attached to one of the first and second members.

56. The salvage device of claim 55 wherein one end of the rod is pivotally attached to the first member, the rod being adapted to be lifted into a raised position to load and unload modules on the rod and lowered into a support position to hold the modules over the component receiver.

57. The salvage device of claim 48 wherein the module holder comprises a module rack having first and second rods spaced apart from one another along the first and second members to support opposing edges of a plurality of modules, the first and second rods suspending the modules to juxtapose the components to the component receiver.

58. The salvage device of claim 57 wherein at least one of the first and second rods is moveable with respect to the other along the first and second members to position the first and second rods to hold modules with different dimensions.

59. The salvage device of claim 57 wherein the module rack comprises a plurality of rod pairs, each rod pair having first and second rods spaced apart from one another along the first and second members to support opposing edges of a plurality of modules.

* * * * *